United States Patent
Nayuki et al.

(10) Patent No.: US 11,572,640 B2
(45) Date of Patent: Feb. 7, 2023

(54) ORGANIC FIBER TWISTED YARN CORD

(71) Applicant: Asahi Kasei Kabushiki Kaisha, Tokyo (JP)

(72) Inventors: Ryo Nayuki, Tokyo (JP); Fumiaki Ise, Tokyo (JP); Hiroo Kawahara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 613 days.

(21) Appl. No.: 16/494,414

(22) PCT Filed: Mar. 26, 2018

(86) PCT No.: PCT/JP2018/012202
§ 371 (c)(1),
(2) Date: Sep. 16, 2019

(87) PCT Pub. No.: WO2018/181211
PCT Pub. Date: Oct. 4, 2018

(65) Prior Publication Data
US 2021/0115599 A1    Apr. 22, 2021

(30) Foreign Application Priority Data

Mar. 31, 2017 (JP) .............................. JP2017-071588

(51) Int. Cl.
*D02G 3/48* (2006.01)
*B60C 9/00* (2006.01)
*D02G 3/28* (2006.01)

(52) U.S. Cl.
CPC ............. *D02G 3/48* (2013.01); *B60C 9/0042* (2013.01); *B60C 2009/0092* (2013.01);
(Continued)

(58) Field of Classification Search
CPC ......... D02G 3/28; D02G 3/48; D10B 2331/02
See application file for complete search history.

(56) References Cited

U.S. PATENT DOCUMENTS 3,614,864 A * 10/1971 Diamler et al. ......... D02G 3/28
57/204
3,846,965 A    11/1974 Matsumura et al.
(Continued)

FOREIGN PATENT DOCUMENTS

CN    1637182 A    7/2005
CN    106283307 A    1/2017
(Continued)

OTHER PUBLICATIONS

Supplementary European Search Report issued in corresponding European Patent Application No. 18777847.7 dated Jul. 6, 2020.
(Continued)

*Primary Examiner* — Shaun R Hurley
(74) *Attorney, Agent, or Firm* — Morgan, Lewis & Bockius LLP

(57) ABSTRACT

Provided is an organic fiber doubled-and-twisted yarn cord the twist structure of which is uniform and with which it is possible to reduce weight. A doubled-and-twisted yarn cord comprising an organic fiber characterized in that a total fineness is 5000-15000 dtex inclusive, a coefficient of twisted yarn length difference between untwisting yarns constituting the doubled-and-twisted yarn cord that is obtained by an expression: coefficient of twisted yarn length difference (%)=(maximum value of yarn length difference between untwisting yarns)/(average value of yarn length of untwisting yarns)×100 is 1.5% or less, and breaking strength is 7.0 cN/dtex or greater.

15 Claims, 3 Drawing Sheets

(52) U.S. Cl.
CPC ........... *D02G 3/28* (2013.01); *D10B 2331/02* (2013.01); *D10B 2505/022* (2013.01)

(56) References Cited

U.S. PATENT DOCUMENTS

| | | | |
|---|---|---|---|
| 5,855,704 A * | 1/1999 | Reuter | D02G 3/48 |
| | | | 152/526 |
| 6,351,933 B1 * | 3/2002 | Reuter | D02G 3/26 |
| | | | 57/244 |
| 10,208,407 B2 * | 2/2019 | Fidan | B60C 9/0042 |
| 2003/0026981 A1 | 2/2003 | Kato et al. | |
| 2011/0016841 A1 | 1/2011 | Popper et al. | |
| 2016/0376733 A1 | 12/2016 | Jeon et al. | |
| 2017/1606698 | 4/2017 | Jeon et al. | |
| 2018/0134098 A1 | 5/2018 | Inoue | |
| 2018/0186185 A1 * | 7/2018 | Fidan | B60C 9/005 |

FOREIGN PATENT DOCUMENTS

| | | |
|---|---|---|
| EP | 0320290 A2 | 6/1989 |
| EP | 1502975 A2 | 2/2005 |
| JP | S49-007537 A | 1/1974 |
| JP | S56-028224 Y2 | 7/1981 |
| JP | S63-270945 A | 11/1988 |
| JP | H01-257605 A | 10/1989 |
| JP | H02-042230 A | 2/1990 |
| JP | H02-282168 A | 11/1990 |
| JP | H04-002832 A | 1/1992 |
| JP | H04-185711 A | 7/1992 |
| JP | H06-207338 A | 7/1994 |
| JP | H11-200266 A | 7/1999 |
| JP | 2000-320616 A | 11/2000 |
| JP | 2002-339275 A | 11/2002 |
| JP | 2003-055855 A | 2/2003 |
| JP | 2003-221740 A | 8/2003 |
| JP | 2004-306635 A | 11/2004 |
| JP | 2005-048311 A | 2/2005 |
| JP | 2005-344266 A | 12/2005 |
| JP | 2006-002263 A | 1/2006 |
| JP | 2007-254945 A | 10/2007 |
| JP | 2007-291568 A | 11/2007 |
| JP | 2009-040245 A | 2/2009 |
| JP | 2009-235647 A | 10/2009 |
| JP | 2010-111983 A | 5/2010 |
| JP | 2011-121439 A | 6/2011 |
| JP | WO2012/014309 A1 | 2/2012 |
| JP | 2012-219389 A | 11/2012 |
| JP | 2013-181268 A | 9/2013 |
| JP | 2016-506453 A | 3/2016 |
| JP | 2017-014678 A | 1/2017 |
| WO | 02/068738 A1 | 9/2002 |
| WO | 2014/104680 A1 | 7/2014 |
| WO | 2017/022589 A1 | 2/2017 |

OTHER PUBLICATIONS

International Search Report issued in corresponding International Patent Application No. PCT/JP2018/012202 dated Jun. 26, 2018.
International Preliminary Report on Patentability and Written Opinion issued in corresponding International Patent Application No. PCT/JP2018/012202 dated Oct. 10, 2019.
Textile Engineering (III), 2nd ed., Japanese Society of Textile Machinery, 251-272, 248-369 (2001).
JIS Handbook, 31, Textile, 849, 860 (2011).

* cited by examiner

ORGANIC FIBER TWISTED YARN CORD

FIELD

The present invention relates to a twisted yarn cord composed of organic fibers (hereinafter referred to as "organic fiber twisted yarn cord", "organic fiber cord", "twisted yarn cord", or simply "cord"), a tire cord for aircraft radial tires having an especially high fineness, and a method for the production thereof.

BACKGROUND

Since organic fiber twisted yarn cords have excellent strength and durability among cord materials used for the reinforcement of various rubber products including tires, such cords have conventionally been used as a reinforcing material for aircraft tires.

Aircraft radial tires are large and can withstand high loads when travelling on land, such as during taxiing, and it is necessary that the fiber cords used as reinforcing materials thereof have increased total fineness. Specifically, it is necessary that the total fineness of the cord be 5000 dtex or higher. Furthermore, weight reduction, increased fuel efficiency, and resource savings of tires have also been strongly demanded.

Though methods regarding the arrangement of ply within the tire and reducing the amount of ply used to achieve weight reduction while maintaining high durability have been conventionally examined with regard to the problem of a reduction in the weight of tires, there has been little investigation regarding a reduction in the weight of the ply itself.

In the twisting process at the time of production of the cord used in the ply, if the alignment of the fibers is poor and the uniformity of the twist structure of the cord is low, in the machining process in which a topping sheet is produced, when a plurality of cords in the form of a sheet are supplied to the topping device, since the alignment between the cords is not uniform, and the cord positions within the topping sheet are uneven, the flatness of the topping sheet is reduced, whereby there is a problem that the thickness of the rubber (the amount used) at the time of rubber application cannot be reduced, and as a result, weight reduction and cost reduction of the tire cannot be achieved, and alignment with an especially high fineness cord is difficult.

Patent Literature 1 below discloses a steel cord having a reduced cord diameter, wherein as a means of weight reduction of the ply, when n second filaments are spirally wound around an untwisted first filament, the first filament is spirally shaped at the same pitch as the spiral winding of the second filaments. However, this technology applies to metal cords such as steel cords, which can be pre-shaped. This technology is not suitable for reducing the weight of a topping sheet in which an organic fiber cord is used.

Furthermore, though Patent Literature 2 below discloses a polyketone fiber cord having a uniform twist structure achieved by maintaining the twisting tension at a high value, the production of organic fiber cords having a total fineness of 5000 dtex or more and a uniform twist structure is not disclosed in any way. Though polyketone fiber cord is highly rigid as a material, it is inferior to conventional organic fiber materials in terms of fatigue resistance. Patent Literature 2 does not disclose an organic fiber twisted yarn cord which is excellent in flexibility and which is excellent in fatigue resistance in high load applications.

CITATION LIST

Patent Literature

[PTL 1] Japanese Unexamined Patent Publication (Kokai) No. 2012-219389
[PTL 2] Japanese Unexamined Patent Publication (Kokai) No. 2006-2263

SUMMARY

Technical Problem

In light of the above problems of the prior art, the object of the present invention is to provide an organic fiber twisted yarn cord that contributes to tire weight reduction, a method for the production thereof, and a fiber reinforced composite material using the cord as a reinforcing material.

Solution to Problem

In order to achieve the above object, the present inventors have examined, as a means for achieving a uniform twist structure, maintaining the tension of an organic fiber cord having a total fineness of 5000 dtex or more at a high value during twisting in order to improve the alignment of fibers. However, it has been found that if the tension during twisting is high, while fiber alignment is improved, the fibers can become damaged due to abrasion with the twisting equipment, resulting in a problem in that durability in high load applications is reduced.

As a result of rigorous investigation, the present inventions have found that by controlling the yarn feed tension in a high fineness twist process with a method in which abrasion damage is minimized, an organic fiber twisted yarn cord having good fiber alignment, a uniform cord twist structure, excellent durability in high load applications, and weight reduction of the tire while suppressing of abrasion damage at the time of twisting can be obtained, and have thus completed the present invention.

In other words, the present invention is as follows.

[1] An organic fiber twisted yarn cord having a total fineness in the range of 5000 dtex to 15000 dtex, wherein a coefficient of twisted yarn length difference between untwisted yarns constituting the twisted yarn cord obtained from the following formula:

coefficient of twisted yarn length difference (%)=(maximum value of fiber length difference between untwisted yarns)/(average value of fiber length of untwisted yarns)×100 is not greater than 1.5%, and breaking strength of the twisted yarn cord is not less than 7.0 cN/dtex.

[2] The organic fiber twisted yarn cord according to [1], wherein a coefficient of breaking strength variation (CV %) of the organic fiber twisted yarn cord obtained by the following formula:

coefficient of breaking strength variation (%)=(standard deviation of breaking strength)/(average value of breaking strength)×100 is not greater than 2.0%.

[3] The organic fiber twisted yarn cord according to [1] or [2], wherein a twisted yarn damage degree of the untwisted yarns constituting the organic fiber twisted yarn cord obtained by the following formula:

> twisted yarn damage degree (%)=(elongation rate of untwisted yarn at point at which stress before breaking becomes maximum)−(elongation rate of untwisted yarn at maximum point in differential Young's modulus curve)

is not less than 3.2%.

[4] The organic fiber twisted yarn cord according to [3], wherein the twisted yarn damage degree is not less than 3.7%.

[5] The organic fiber twisted yarn cord according to any one of [1] to [4], wherein a twist factor K of a second twist obtained by the following formula:

$$\text{twist factor of second twist } K = Y \times D^{0.5},$$

where Y is the number of twists (T/m) per meter of the organic fiber twisted yarn cord, and D is the total fineness (dtex) of the organic fiber twisted yarn cord, is in the range of 10000 to 30000.

[6] A fiber reinforced material comprising the organic fiber twisted yarn cord according to any one of [1] to [5].

[7] A method for the production of an organic fiber twisted yarn cord, comprising producing a fiber cord by twisting organic fibers, wherein a yarn feed tension of the organic fibers is 0.01 cN/dtex to 0.3 cN/dtex.

[8] A method for the production of an organic fiber twisted yarn cord, comprising producing a fiber cord by first twisting and winding organic fibers, and combining and second twisting not less than two of the first twisted yarns, wherein a yarn feed tension of the organic fibers in the first twist and the second twist is 0.01 cN/dtex to 0.3 cN/dtex.

[9] A method for the production of an organic fiber twisted yarn cord, comprising producing a fiber cord by separately twisting a plurality of organic fibers, and thereafter twisting the plurality of organic fibers together without winding an obtained first twisted fiber, wherein a feed tension of the organic fibers is 0.01 cN/dtex to 0.3 cN/dtex.

[10] A method for the production of an organic fiber twisted yarn cord, comprising producing a fiber cord by twisting organic fibers using a ring twisting machine, wherein a flatness of a cross section of a balloon control ring obtained from the following formula:

> flatness=1−(short radius of ellipse/long radius of ellipse)

is in the range of 0.50 to 0.95.

[11] The method according to any one of [7] to [10], wherein the organic fibers have an elongation rate of 8.0 to 14.0% under a load of 4.56 cN/dtex in a direction of elongation.

[12] The method according to any one of [7] to [11], wherein a degree of entanglement of the organic fibers is in the range of 4.0 to 14.0.

[13] The method according to any one of [7] to [12], wherein the organic fibers are polyhexamethylene adipamide fibers.

Advantageous Effects of Invention

The organic fiber twisted yarn cord according to the present invention is a twisted yarn cord having a high fineness, and in addition to the excellent strength and durability inherently provided by the organic fibers, the uniformity of the twist structure is high, and thus, the alignment between cords during production of a topping sheet is suitable, whereby a thin topping sheet having a reduced amount of rubber used is provided, and a weight reduction in tires, in particular in aircraft tires used in high load areas, can be achieved.

DESCRIPTION OF EMBODIMENTS

The embodiments of the present invention will be described in detail below.

The fibers constituting the twisted yarn cord of the present embodiment are organic fibers and may be, for example, polyhexamethylene adipamide fibers, polyethylene terephthalate fibers, or rayon fibers. Among these, polyhexamethylene adipamide fibers are particularly preferable from the viewpoints of rubber adhesion, heat resistance, and durability.

The total fineness of the organic fiber twisted yarn cord is 5000 dtex to 15000 dtex. If the total fineness is 15000 dtex or less, the rigidity of individual plies can be reduced, whereby tire production is not hindered.

Furthermore, it is necessary that a difference in the coefficient of twisted yarn length between the yarns constituting the cord of 1.5% or less be satisfied. The difference is more preferably 1.4% or less, further preferably 1.3% or less, even further preferably 1.2% or less, and especially preferably 0.9% or less. The term "twisted yarn cord" as used herein means a single cord formed by twisting a plurality of yarns of one type or a plurality of types together in a twisting process.

The coefficient of twisted yarn length difference between untwisted yarns constituting the twisted yarn cord is determined by the following formula (1):

> coefficient of twisted yarn length difference (%)= (maximum value of fiber length difference between untwisted yarns)/(average value of fiber length of untwisted yarns)×100 from the fiber length difference between untwisted yarns and the untwisted yarn length in a state in which the twisted yarn cord is untwisted and the fibers constituting the cord are untwisted.

When the value of the coefficient of untwisted yarn length difference is a low value of 1.5% or less, the uniformity of the twist structure is good, and when a plurality of cords are provided in the form of a sheet to a topping device, the alignment between the cords is uniform and the surface flatness of the topping sheet is satisfied, whereby the rubber thickness (amount used) at the time of rubber coating can be reduced, and a weight reduction and cost reduction of the tire can be achieved.

Twisting becomes more homogenous as the coefficient of twisted yarn length difference becomes smaller. As a result, the thickness of a topping sheet (single ply) comprising the cords aligned and laminated with rubber layers can be reduced. If the value is zero, a completely uniform twist is obtained.

The twisted yarn damage degree of the untwisted yarns constituting the organic fiber twisted yarn cord is obtained from the following formula (3):

twisted yarn damage degree (%)=(elongation rate of untwisted yarn at point at which stress before breaking becomes maximum)−(elongation rate of untwisted yarn at maximum point in differential Young's modulus curve).

Figure 1:
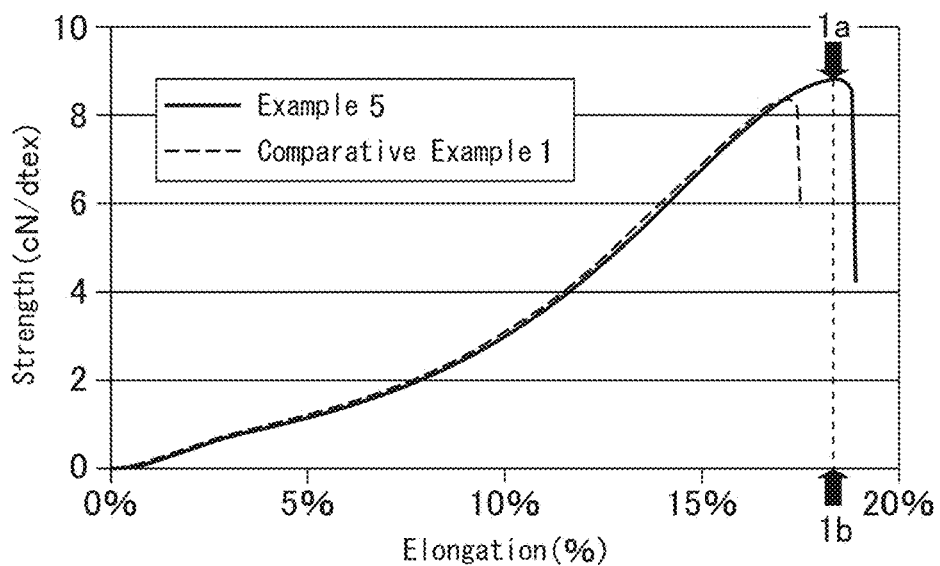
FIG. 1 shows the stress-strain (strength-elongation) curves of the filaments constituting the organic fibers of Example 5 and Comparative Example 1 in an untwisted state prior to twisting (untwisted yarns).
Figure 2:
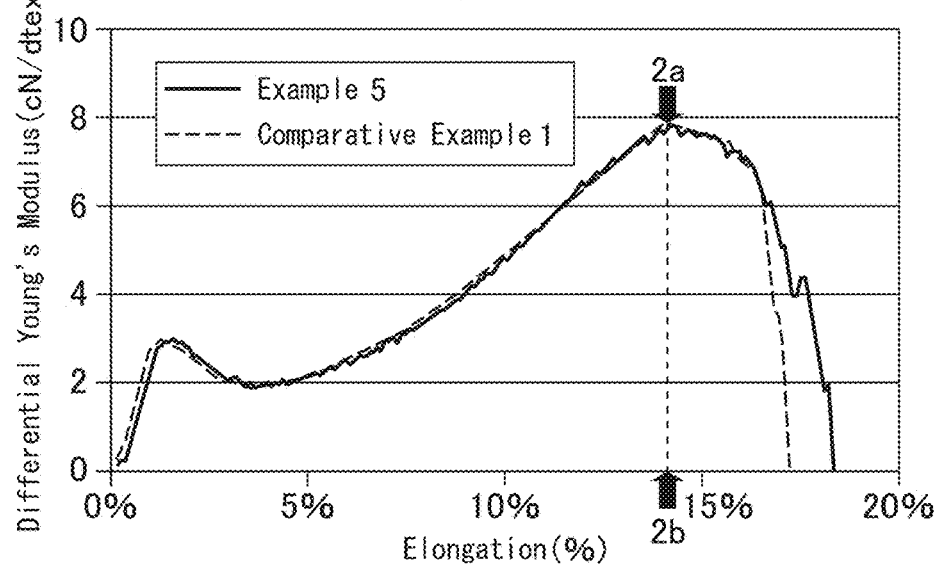
FIG. 2 shows the differential Young's modulus-strain (elongation) curves of the filaments constituting the organic fiber cords of Example 5 and Comparative Example 1 in an untwisted state prior to twisting (untwisted yarns).

As the value thereof decreases, the damage to the cord after twisting increases. The phrase "elongation rate of untwisted yarn at point at which stress before breaking becomes maximum" means the value represented by reference numeral $1b$ in the stress-strain curve of FIG. 1. The phrase "elongation rate of untwisted yarn at maximum point in differential Young's modulus curve" means the value represented by reference numeral $2b$ in the differential Young's modulus-strain curve of FIG. 2.

During twisting, the yarns contact the twisting device at high speeds. At this time, damage occurs in the fiber surface and breakage can occur at a low elongation rate in fiber tensile strength measurement. Thus, when the damage at the time of twisting is significant, the value of the twisted yarn damage degree becomes small.

The twisted yarn damage degree is preferably 3.2% or more, and more preferably 3.7% or more. When the value thereof is 3.2% or more, the damage at the time of twisting is small, and the tensile breaking strength and fatigue resistance of the cord are high. The elongation deformation of a fiber is at its peak at the maximum point of the differential Young's modulus curve, and thereafter irreversible deformation of the polymer structure increases. The occurrence of micro-structural defects also increases, which leads to fracturing of the cord, and damage near the surface increases this fracturing. Thus, there is little elongation after the maximum point of the differential Young's modulus curve. The twisted yarn damage degree is preferably 8% or less in terms of an organic fiber having high strength such that the amount of deformation of the polymer structure is not excessive.

From the viewpoint of performance as an aircraft tire material, the breaking strength of the organic fiber twisted yarn cord is preferably 7.0 cN/dtex or more, more preferably 7.3 cN/dtex or more, and further preferably 7.5 cN/dtex or more. This is because imparting a high strength to the cord reduces fiber usage, which contributes to a weight reduction of the tire. Furthermore, if the strength is 15.0 cN/dtex or less, the cord has suitable rigidity and can be produced using economically accessible organic fibers.

The coefficient of breaking strength variation of the organic fiber twisted yarn cord is obtained from the following formula (2):

coefficient of breaking strength variation (%)=(standard deviation of breaking strength)/(average value of breaking strength)×100.

From the viewpoint of performance as an aircraft tire material, the coefficient of breaking strength variation of the organic fiber twisted yarn cord is preferably 2.0% or less, and more preferably 1.8% or less. This is because destruction of cord is considered to occur at points at which strength weak, and thus, by reducing the coefficient of breaking strength variation, the strength of the weakest portion of the cord can be increased, whereby contribution to weight reduction of the tire when the high strength cord is used is further increased.

The fineness of the organic fibers used for twisting is preferably 400 dtex to 3500 dtex. From the viewpoint of fatigue resistance, the elongation rate under a load of 4.56 cN/dtex in the direction of elongation of such organic fibers is preferably 8.0% to 14.0%, more preferably 10.0% to 13.0%, and further preferably 11.0% to 12.0%. As long as the elongation rate of the organic fibers under a load of 4.56 cN/dtex in the direction of elongation is 8.0% or more, the fatigue resistance is suitable for use in areas in which deformation is significant, and as long as the elongation rate of the organic fibers under a load of 4.56 cN/dtex in the direction of elongation is 14.0% or less, the organic fibers can be used in suitable areas corresponding to the deformation amount when the tire is used.

In order to achieve a homogenous twist structure in which the yarn length difference between constitutional yarns is minimal, to enable topping sheet thinning while maintaining suitable flatness, and to achieve weight reduction by reducing rubber usage amount, it is important to control not only twisting tension, but also to control yarn feed tension, which is not conventionally performed.

In the twisting process, it is preferable that the yarn feed tension be 0.01 cN/dtex to 0.3 cN/dtex, more preferably 0.03 cN/dtex to 0.1 cN/dtex. Conversely, in the twisting process, the tension during twisting is preferably 0.05 cN/dtex to 0.4 cN/dtex, more preferably 0.06 cN/dtex to 0.3 cN/dtex, and further preferably 0.07 cN/dtex to 0.2 cN/dtex.

If the yarn feed tension is 0.01 cN/dtex or more, it is possible to achieve a homogenous twist structure in which the yarn length difference between constitutional yarns is minimal, to enable topping sheet thinning while maintaining suitable flatness, and to achieve weight reduction by reducing rubber usage amount. Furthermore, if the yarn feed tension is 0.3 cN/dtex or less, damage to the fiber in the fiber feed stage is suppressed, whereby the strength of the cord is not reduced and fuzzing does not occur.

Figure 5:
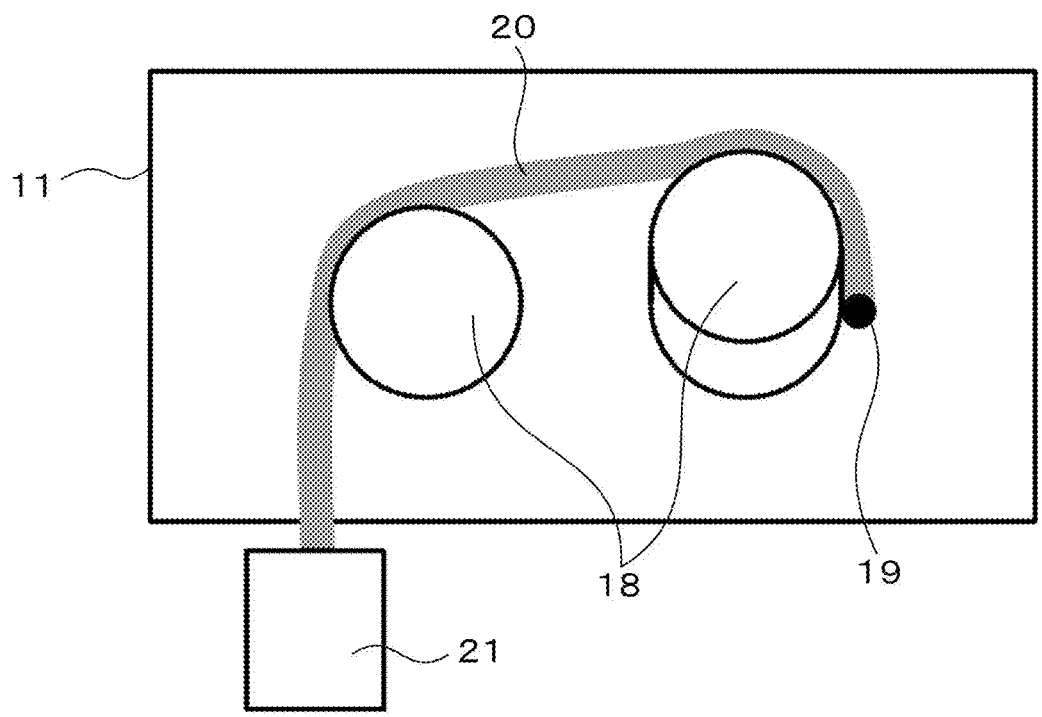
FIG. 5 is a schematic front view of a yarn tension adjustment mechanism used in Examples 1 to 9 and Comparative Examples 2 to 4 as viewed from above.
Figure 6:
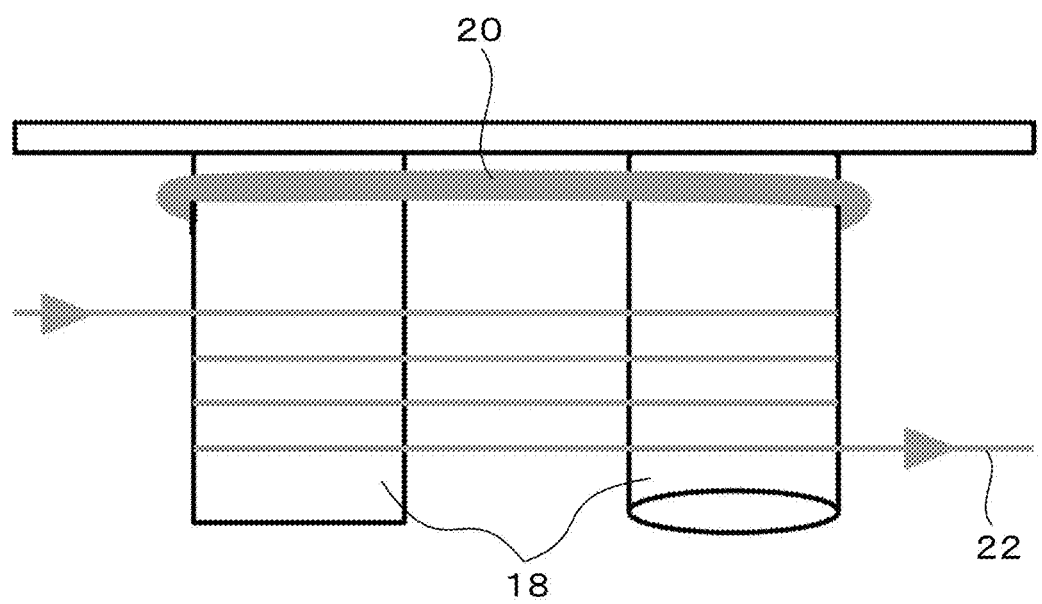
FIG. 6 is a schematic diagram of the yarn tension adjustment mechanism used in Examples 1 to 9 and Comparative Examples 2 to 4 as viewed from above.

In order to suppress damage to the fibers caused by abrasion, it is preferable that the roller-type adjustment mechanism shown in FIGS. 5 and 6 be used for adjustment of the yarn tension. This can suppress damage to the fibers due to abrasion by applying resistance to the rotation of the roller on which the fibers are wound to apply tension, rather than applying abrading frictional resistance to the fibers to impart tension thereto. Further, tension adjustment can be performed by adjusting in accordance with the mass of the weight when resistance is applied to the roller.

The twisting method may be a method in which one or more organic fibers are first twisted using a ring twisting machine, and are wound, and thereafter two resulting first twisted yarns are combined and second twisted, or may be a method in which two or more organic fibers are individually twisted using a straight twisting machine, and the resulting first twisted yarns are thereafter twisted together without being wound.

Figure 3:
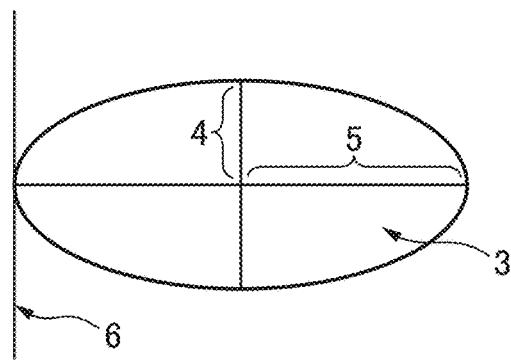
FIG. 3 is a schematic cross-sectional view of a balloon control ring having a flatness of 0.8 used in Examples 3 and 5 to 9.
Figure 4:
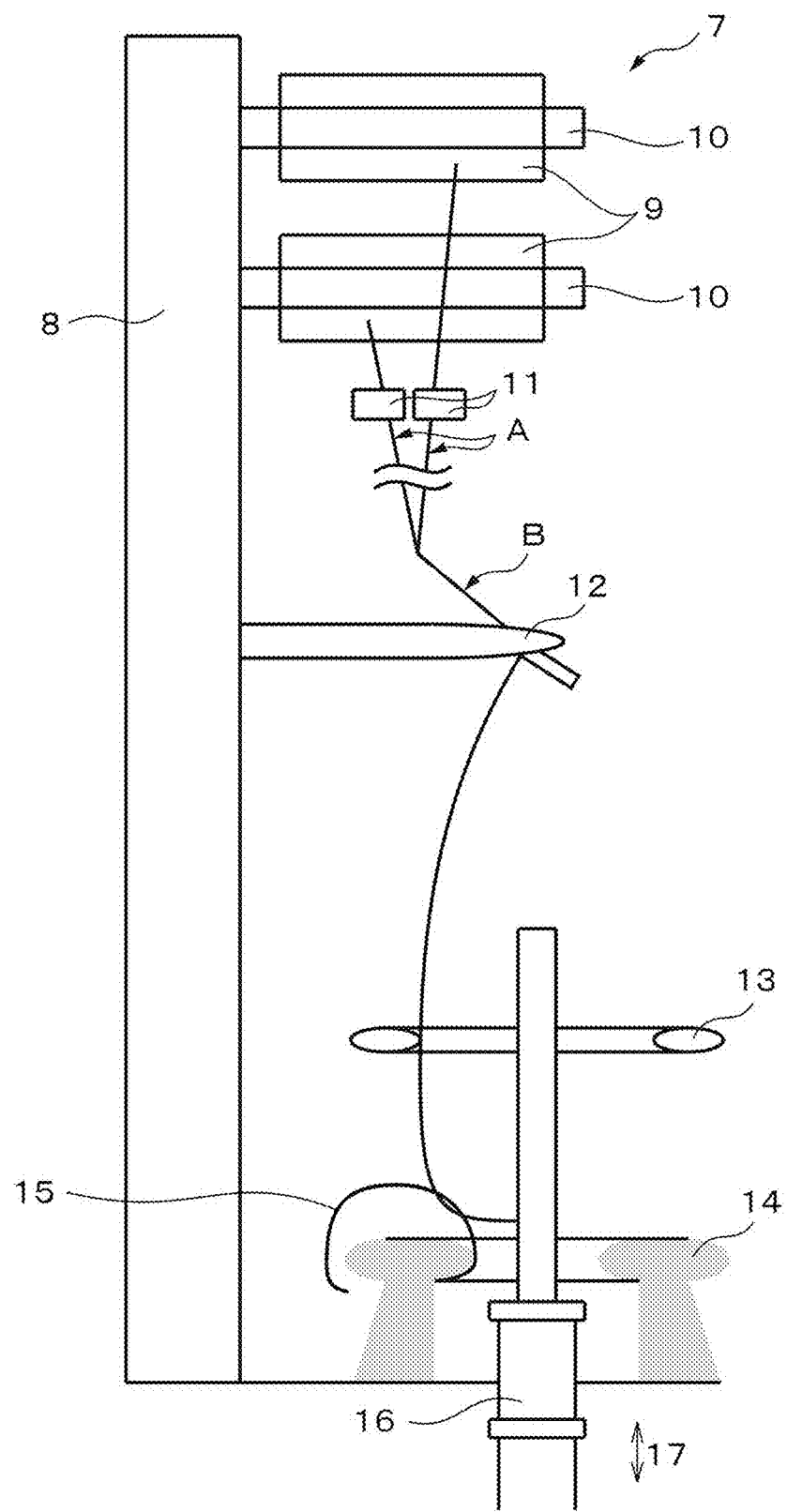
FIG. 4 is a schematic diagram of a ring twisting machine used in Examples 1 to 9 and Comparative Examples 1 to 4.

Furthermore, when twisting is performed using a ring twisting machine, it is preferable that the cross section of the balloon control ring have a flatness of 0.50 to 0.95, more preferably 0.70 to 0.90. When a ring having the elliptical cross section shown in FIG. 3 is used, and the cord contacts the long diameter side during twisting, the contact area between the fiber and the ring is reduced, whereby abrasion damage can be suppressed. The rigidity of the ring can be maintained by setting the flatness to 0.95 or less. Such balloon control rings are particularly useful since the diameter of the cord is increased in high fineness twisting, whereby the contact area between the cord and the ring is increased.

Flatness can be obtained from the following formula:

flatness=1−(short radius of ellipse/long radius of ellipse).

Furthermore, the degree of entanglement of the organic fiber as a yarn used in the production of the organic fiber twisted yarn cord of the present embodiment is preferably in the range of 4.0 to 14.0, more preferably in the range of 5.0 to 10.0. Since the entangled part and the non-entangled part of the yarn differ in the constrained state of the yarn and differ in the contact state between the twisting machine and the yarn when twisting is performed, the frictional resistance between the twisting machine and the yarn fluctuates, which can be a factor that impedes the twist uniformity. If the degree of entanglement of a yarn is 14.0 or less, in addition to the small fluctuation in frictional resistance between the twisting machine and the yarn during twisting due to the entangled part, the tension during twisting promotes disentanglement of the fibers, whereby the constraint between filaments due to entanglement is reduced, and the obtained twisted yarn can achieve a more uniform structure. If the degree of entanglement is 4.0 or more, the filaments do not separate when handled during processing, whereby the handleability is not reduced, and fuzzing is less likely to occur when twisting is performed.

The type of the organic fiber twisted yarn cord of the present embodiment may be, for example, a single-twisted yarn cord, a double-twisted yarn cord, or the like. The number of twists is not particularly limited, and a twist number of one, two, three, four, or five may be used, or six or more may be used.

Furthermore, regarding the type of the organic fibers constituting the cord, twisting of a single type of organic fibers may be used, or may twisting of a plurality of types of organic fibers may be used. From the viewpoint of twist uniformity, twisting of a single type of organic fibers is particularly preferable.

Since the number of twists changes in accordance with single-fiber fineness and total fineness, the number of twists may be arbitrarily selected depending on the design of the tire. In the case of a twisted yarn cord comprising a polyhexamethylene adipamide filament, a twist factor K, which is represented by $K=Y \times D^{0.5}$, during the second twist in the range of 10000 to 30000, more preferably in the range of 18000 to 25000, is preferable from the viewpoint of strength and fatigue resistance. When the twist factor K is 10000 or more, the twisting of the fibers is sufficient, whereby fatigue resistance is not reduced. Furthermore, when the twist factor K is 30000 or less, the reduction in cord strength due to twisting is small. In the above formula, Y is the number of twists (T/m) per meter of the fiber cord and D is the total fineness (dtex) of the fiber cord.

EXAMPLES

The present invention will be specifically described by way of the Examples and Comparative Examples. However, the present invention is not limited to these Examples. The measurement values in the examples are measured by the following methods.

[Coefficient of Twisted Yarn Length Difference]

Marks representing a length of 1 m are made on the twisted yarn cord, all of the twists including the first twist and the second twist are untwisted using a twisting machine, and each untwisted yarn is separated. The distance between the marks is measured in accordance with JIS-L-1013 5.1 for each untwisted yarn in a state in which an initial load relative to the fineness of the untwisted yarn is applied. The average value of the untwisted length of each fiber and the maximum value of the fiber length difference between the untwisted yarns are determined. Thereafter, the coefficient of twisted yarn length difference is calculated by the following formula (1):

coefficient of twisted yarn length difference (%)= (maximum value of fiber length difference between untwisted yarns)/(average value of fiber length of untwisted yarns)×100   (1), the same operation is repeated ten times, and the average value is calculated.

[Breaking Strength, Elongation at Break, and Fineness]

Breaking strength, elongation at break, and fineness are measured in accordance with JIS-L-1017 8.3a and 8.5.

[Coefficient of Breaking Strength Variation]

Breaking strength is measured ten times in accordance with JIS-L-1017 8.5, the standard deviation and the average value are determined, and the coefficient of breaking strength variation is calculated from the following formula (2):

coefficient of breaking strength variation (%)=(standard deviation of breaking strength)/(average value of breaking strength)×100.

[Differential Young's Modulus]

Measurement is performed in accordance with JIS-L-1017 8.5, and the stresses at each point on the obtained stress (cN/dtex)-strain (%) curve are determined by differentiating by elongation.

[Twisted Yarn Damage Degree]

All of the twists, including the first twist and the second twist, of a twisted yarn cord are untwisted using an untwisting machine to produce untwisted yarns. Thereafter, the breaking strength, elongation rate, and differential Young's modulus of each untwisted yarn is measured in accordance with JIS-1017 8.5, and the twisted yarn damage degrees thereof are calculated by the following formula (3):

twisted yarn damage degree (%)=(elongation rate of untwisted yarn at point at which stress before breaking becomes maximum)−(elongation rate of untwisted yarn at maximum point in differential Young's modulus curve).

The same operation is repeated ten times, and the average value thereof is calculated.

[Degree of Entanglement]

Degree of entanglement is measured in accordance with JIS-L-1013 8.15.

[Yarn Feed Tension]

The tension of the portion where the fiber is fed to the twisting machine is measured using an IT-NR tension meter manufactured by Technomac Co., Ltd.

[Tension During Twisting]

The tension of the portion where the fiber is actually twisted is measured using an IT-NR tension meter manufactured by Technomac Co., Ltd.

[Fatigue Resistance]

Organic fiber cords are treated with a Resorcinol-formalin-latex (RFL) liquid to produce RFL-treated cords. 5 cm×60 cm length rubber topping sheets are produced by aligning, in the case of 1400 dtex/2 cords, 60 strands/5 cm, in the case of 2800 dtex/2 cords, 30 strands/5 cm, and in the case of 1400 dtex/2/3 cords and 2100 dtex/2/2 cords, 25 strands/5 cm of these cords by thread count and laminating 0.4 mm sheets of unvulcanized compound rubber on both sides thereof. Unvulcanized compound rubber sheets having a thickness of 3 mm are interposed between two of the obtained topping sheets, unvulcanized compound rubber sheets are further laminated on the upper and lower surfaces thereof such that the thicknesses of the entireties of the samples become 15 mm, the ends of the cords are secured, and vulcanization is performed at a constant length at 145° C. at a pressure of 20 kg/cm$^2$ for 40 minutes to prepare flexural fatigue test samples. Next, the samples are placed on pulleys having a diameter of 60 mm, and a load of 200 kg is applied to the ends thereof, and repeated flexing at a rate of 5,000 repetitions per hour at an ambient temperature of 120° C. is performed. After one million flexing repetitions, the samples are removed, the cords on the side that contact the pulley (the side that is subject to repeated compressive strain) are removed from the two layers of the organic fiber cord, the breaking strengths thereof are measured, and the retention rate (%) relative to the value to the strength of the sample when new before the bending test is determined. The retention rate is expressed as an index relative to a retention rate of 100 of the prior art 1400 dtex/2 hexamethylene adipamide fiber cord having a twist factor of 21000.

[Topping Sheet Flatness]

Organic fiber cords are treated with an RFL liquid to produce RFL-treated cords. In the case of 2800 dtex/2 cords, 30 strands/5 cm are aligned, in the case of 1400 dtex/2/3 and 2100 dtex/2/2, 20 strands/5 cm are aligned, by thread count, and wound onto a beam having a 5 cm width. Next, topping sheets are produced by topping the beam with unvulcanized compound rubber using a triple roller and winding the cord/rubber laminate sheet with a liner, and the flatnesses thereof are visually confirmed. Obtained topping sheets which do not have surface irregularities are suitable, and topping sheets in which small wrinkle-like irregularities are present are not suitable. At this time, the thickness of the topping sheets is made to be 10% thinner than the thickness of a thin sheet in which a sheet was produced using a cord of the prior art having the same twist shape and having suitable flatness. Similarly, sheets which are 20% thinner are also produced. For example, in Example 1, a sheet which is as thin as possible while still maintaining suitable flatness is produced using a 2100 dtex/2/2 cord according to the prior art (having the same number of twists as Example 1), a sheet having a thickness of 10% thinner than and a sheet having a thickness of 20% thinner than such a sheet are produced using the cord produced in Example 1, and their flatnesses are confirmed. The same test is repeated 10 times, and evaluation is performed, wherein an evaluation of "Excellent" is assigned if the flatness is suitable in all 10 tests, an evaluation of "Good" is assigned if the flatness is suitable in 7 to 9 of the tests, and an evaluation of "Poor" is assigned if the flatness is suitable in 6 or fewer tests.

Example 1

A 2100 dtex/2/2 cord was produced by aligning two strands of 2100 dtex polyhexamethylene adipamide fiber having a degree of entanglement of 16, imparting a first twist thereto, aligning two strands of the obtained first twisted yarn cord, and thereafter imparting a second twist thereto. During the first twist and the second twist, the yarn feed tension was adjusted to 0.03 cN/dtex by a roller-type yarn tension adjustment mechanism. Furthermore, the tension during the first twist was 0.09 cN/dtex, the tension during the second twist was 0.13 cN/dtex, and a ring twisting machine in which the cross-sectional shape of the balloon control ring had a flatness of 0.0 was used during twisting. Next, the cord was treated with an RFL liquid to produce an RFL-treated cord, and the fatigue resistance and topping sheet flatness thereof were confirmed. The characteristics of the obtained cord are shown in Table 1 below.

Example 2

A twisted yarn cord was produced in the same manner as Example 1 except that the yarn feed tension during the first twist and the second twist was 0.1 cN/dtex. The characteristics of the obtained cord are shown in Table 1 below.

Example 3

A twisted yarn cord was produced in the same manner as Example 1 except that the yarn feed tension during the first twist and the second twist was 0.05 cN/dtex. Furthermore, during twisting, a ring twisting machine in which the cross-sectional shape of the balloon control ring had a flatness of 0.8 was used. The characteristics of the obtained cord are shown in Table 1 below.

Example 4

A twisted yarn cord was produced in the same manner as Example 1 except that the yarn feed tension during the first twist and the second twist was 0.05 cN/dtex. Furthermore, a 2100 dtex polyhexamethylene adipamide fiber having a degree of entanglement of 8 was used for the yarn in the production of the cord. The characteristics of the obtained cord are shown in Table 1 below.

Example 5

A twisted yarn cord was produced in the same manner as Example 1 except that a 2100 dtex polyhexamethylene adipamide fiber having a degree of entanglement of 8 was used for the yarn in the production of the cord. Furthermore, during twisting, a ring twisting machine in which the cross-sectional shape of the balloon control ring had a flatness of 0.8 was used. The characteristics of the obtained cord are shown in Table 1 below.

Example 6

A twisted yarn cord was produced in the same manner as Example 2 except that a 2100 dtex polyhexamethylene adipamide fiber having a degree of entanglement of 8 was used as the yarn in the production of the cord. Furthermore, during twisting, a ring twisting machine in which the cross-sectional shape of the balloon control ring had a flatness of 0.8 was used. The characteristics of the obtained cord are shown in Table 1 below.

Example 7

A twisted yarn cord was produced in the same manner as Example 3 except that a 2100 dtex polyhexamethylene adipamide fiber having a degree of entanglement of 8 was used as the yarn in the production of the cord. The characteristics of the obtained cord are shown in Table 1 below.

Example 8

A 1400 dtex/2/3 cord was produced by aligning two strands of a 1400 dtex polyhexamethylene adipamide fiber having a degree of entanglement of 8, imparting a first twist thereto, aligning three strands of the obtained first twisted yarn cord, and thereafter applying a second twist thereto. During the first twist and the second twist, the yarn feed tension was adjusted to 0.05 cN/dtex by a roller-type yarn tension adjustment mechanism. Furthermore, the tension during the first twist was 0.09 cN/dtex, the tension during the second twist was 0.13 cN/dtex, and during twisting, a ring twisting machine in which the cross-sectional shape of the balloon control ring had a flatness of 0.8 was used. Next, the cord was treated with an RFL-liquid to produce an RFL-treated cord, and the fatigue resistance and topping sheet flatness thereof were confirmed. The characteristics of the obtained cord are shown in Table 1 below.

Comparative Example 1

A 2100 dtex/2/2 cord was produced by aligning two strands of a 2100 dtex polyhexamethylene adipamide fiber having a degree of entanglement of 16, imparting a first twist thereto, aligning two strands of the obtained first twisted yarn cord, and thereafter imparting a second twist thereto. During the first twist and the second twist, the yarn feed tension was not controlled, and a ring twisting machine in which the cross-sectional shape of the balloon control ring had a flatness of 0.0 was used during twisting. Next, the cord was treated with an RFL liquid to produce an RFL-treated cord, and the fatigue resistance and topping sheet flatness thereof were confirmed. The characteristics of the obtained cord are shown in Table 2 below.

Comparative Example 2

A twisted yarn cord was produced in the same manner as Example 5 except that the yarn feed tension during the first twist and the second twist was 0.008 cN/dtex. The characteristics of the obtained cord are shown in Table 2 below.

Comparative Example 3

A twisted yarn cord was produced in the same manner as Example 5, except that the yarn feed tension during the first twist and the second twist was 0.4 cN/dtex. The characteristics of the obtained cord are shown in Table 2 below.

Comparative Example 4

Production of a twisted yarn cord in the same manner as Example 5 was attempted. Though twisting was attempted using a polyhexamethylene adipamide fiber having a degree of entanglement of 3, disentanglement and fuzzing occurred frequently, whereby a twisted yarn cord could not be obtained.

TABLE 1

|  | Ex 1 | Ex 2 | Ex 3 | Ex 4 | Ex 5 | Ex 6 | Ex 7 | Ex 8 |
|---|---|---|---|---|---|---|---|---|
| Twisted Yarn Form | 2100/2/2 | 2100/2/2 | 2100/2/2 | 2100/2/2 | 2100/2/2 | 2100/2/2 | 2100/2/2 | 1400/2/3 |
| Fineness (dtex) | 8400 | 8400 | 8400 | 8400 | 8400 | 8400 | 8400 | 8400 |
| Twist Factor K | 21500 | 21500 | 21500 | 21500 | 21500 | 21500 | 21500 | 24000 |
| Strength (cN/dtex) | 7.58 | 7.54 | 7.62 | 7.60 | 7.63 | 7.61 | 7.67 | 7.70 |
| Coefficient of Twisted Yarn Length Difference (%) | 1.13 | 0.96 | 1.02 | 0.77 | 0.78 | 0.70 | 0.74 | 1.00 |
| Coefficient of Breaking Strength Variation (%) | 1.75 | 1.78 | 1.58 | 1.70 | 1.62 | 1.50 | 1.51 | 1.60 |
| Twisted Yarn Damage Degree (%) | 3.75 | 3.72 | 4.12 | 3.78 | 4.26 | 4.22 | 4.33 | 4.30 |
| Elongation Rate (%) of Yarns Used Under Load of 4.56 cN/dtex | 11.5 | 11.5 | 11.5 | 11.5 | 11.5 | 11.5 | 11.5 | 11.5 |
| Degree of Entanglement of Yarns Used | 16 | 16 | 16 | 8 | 8 | 8 | 8 | 8 |
| Flatness of Cross Section of Balloon Control Ring | 0.0 | 0.0 | 0.8 | 0.0 | 0.8 | 0.8 | 0.8 | 0.8 |
| (During First Twist) | | | | | | | | |
| Yarn Feed Tension (cN/dtex) | 0.03 | 0.1 | 0.05 | 0.05 | 0.03 | 0.1 | 0.05 | 0.05 |
| (During Second Twist) | | | | | | | | |
| Yarn Feed Tension (cN/dtex) | 0.03 | 0.1 | 0.05 | 0.05 | 0.03 | 0.1 | 0.05 | 0.05 |
| Fatigue Resistance (Index) | 101 | 101 | 106 | 102 | 106 | 105 | 107 | 108 |
| Topping Sheet Flatness | | | | | | | | |
| During 20% Thinning | Excellent | Excellent | Excellent | Excellent | Excellent | Excellent | Excellent | Excellent |
| During 20% Thinning | Good | Good | Good | Excellent | Excellent | Excellent | Excellent | Excellent |

TABLE 2

|  | Comp Ex 1 | Comp Ex 2 | Comp Ex 3 | Comp Ex 4 |
|---|---|---|---|---|
| Twisted Yarn Form | 2100/2/2 | 2100/2/2 | 2100/2/2 | 2100/2/2 |
| Fineness (dtex) | 8400 | 8400 | 8400 | 8400 |
| Twist Factor K | 21500 | 21500 | 21500 | 21500 |
| Strength (cN/dtex) | 7.14 | 7.32 | 6.82 | Fibers Could |
| Coefficient of Twisted Yarn Length Difference (%) | 1.93 | 1.72 | 0.70 | Not Be |
| Coefficient of Breaking Strength Variation (%) | 2.27 | 2.14 | 2.52 | Twisted |
| Twisted Yarn Damage Degree (%) | 3.07 | 3.67 | 2.51 | |
| Elongation Rate (%) of Yarns Used Under Load of 4.56 cN/dtex | 11.5 | 11.5 | 11.5 | 11.5 |
| Degree of Entanglement of Yarns Used | 16 | 8 | 8 | 3 |
| Flatness of Cross Section of Balloon Control Ring | 0.0 | 0.8 | 0.8 | 0.8 |

TABLE 2-continued

|  | Comp Ex 1 | Comp Ex 2 | Comp Ex 3 | Comp Ex 4 |
|---|---|---|---|---|
| (During First Twist) | | | | |
| Yarn Feed Tension (cN/dtex) | — | 0.008 | 0.4 | — |
| (During Second Twist) | | | | |
| Yarn Feed Tension (cN/dtex) | — | 0.008 | 0.4 | — |
| Fatigue Resistance (Index) | 91 | 95 | 88 | — |
| Topping Sheet Flatness | | | | |
| During 20% Thinning | Poor | Poor | Excellent | — |
| During 20% Thinning | Poor | Poor | Excellent | — |

In Examples 1 and 2, since the yarn feed tensions during twisting were properly set, the balance of the supply of the yarns to the twisting machine was uniform, whereby the obtained cords had a uniform twist structure, and the topping sheet flatnesses and fatigue resistances thereof were excellent.

In Example 3, in addition to the yarn feed tension during twisting, since the flatness of the balloon control ring was set to an appropriate value during use of the ring twisting machine, abrasion damage during twisting was suppressed, whereby a further improved fatigue resistance was achieved.

In Example 4, in addition to the yarn feed tension during twisting, since the degree of entanglement of the yarns used was set to an appropriate value, the entanglement of the yarns was unraveled due to the tension during twisting, whereby a twisted yarn cord having a more uniform structure was successfully produced, and the thickness could be further reduced while maintaining the flatness of the topping sheet.

In Examples 5 to 8, since the yarn feed tension during twisting, the flatness of the balloon control ring during use of the ring twisting machine, and the degree of entanglement of the yarns used were all appropriately set, the obtained cords had more excellent topping sheet flatnesses and fatigue resistances.

Conversely, in Comparative Example 1, in which the yarn feed tension was not adjusted, the flatness of the balloon control ring was 0 during use of the ring twisting machine, and the degree of entanglement of the yarns was 16, since the balance of the supply of the yarns to the twisting machine was not uniform, the twist structure was not uniform and the coefficient of twisted yarn length difference was high, whereby the topping sheet flatness and fatigue resistance were reduced, and the value of the twisted yarn damage degree was small, whereby the fatigue resistance was reduced.

In Comparative Example 2, in which the yarn feed tension was low, since the balance of the supply of the yarns to the twisting machine was not uniform, the twisting structure was not uniform and the coefficient of twisted yarn length difference was high, whereby the topping sheet flatness and fatigue resistance were reduced.

Micro-wrinkling, portions in which the cord protruded from the sheets, and so-called "core exposure" occurred in the surfaces of the topping sheets produced in Comparative Examples 1 and 2 at the time of 10% and 20% thinning, whereby irregularity in adhesion may occur when lamination the sheets during production of a tire, which is not suitable.

In Comparative Example 3, in which the yarn feed tension was excessive, there was significant abrasion damage to the fibers during the twisting process, whereby fatigue resistance was reduced.

In Comparative Example 4, in which twisting was attempted using polyhexamethylene adipamide yarns having a low degree of entanglement, during the twisting stage, "disentanglement" and fuzzing occurred frequently, whereby a sufficient twisted yarn cord could not be obtained.

INDUSTRIAL APPLICABILITY

Since the organic fiber twisted yarn cord of the present invention has a highly uniform twist structure, can be used in a topping sheet production process to produce a thin, flat sheet, and has suitable fatigue resistance, the organic fiber twisted yarn cord of the present invention can be appropriately applied to the production of a fiber material for the reinforcement of rubber or resin, specifically, a fiber material for reinforcing tires, belts, and hoses.

REFERENCE SIGNS LIST

1$a$ stress maximum point
1$b$ elongation rate of fiber at stress maximum point
2$a$ maximum point of differential Young's modulus
2$b$ elongation rate of fiber at maximum point of differential Young's modulus
3 balloon control ring
4 short radius of ellipse
5 long radius of ellipse
6 fiber contacting balloon control ring
7 ring twisting machine
8 support part
9 organic fiber
10 fixed shaft
11 yarn tension adjusting mechanism
12 yarn guide
13 balloon control ring
14 guide ring
15 traveler
16 spindle
17 lifting part
18 rotating roller
19 fixing bolt
20 belt applying rotational resistance
21 rotation resistance adjustment weight
22 thread
A yarn feed tension measurement unit
B twist tension measurement unit

The invention claimed is:

1. An organic fiber twisted yarn cord having a total fineness in the range of 5000 dtex to 15000 dtex, wherein a coefficient of twisted yarn length difference between untwisted yarns constituting the twisted yarn cord obtained from the following formula:

coefficient of twisted yarn length difference (%)=(maximum value of fiber length difference between untwisted yarns)/(average value of fiber length of untwisted yarns)×100 is not greater than 1.5%, and breaking strength of the twisted yarn cord is not less than 7.0 cN/dtex.

2. The organic fiber twisted yarn cord according to claim 1, wherein a coefficient of breaking strength variation (CV %) of the organic fiber twisted yarn cord obtained by the following formula:

coefficient of breaking strength variation (%)=(standard deviation of breaking strength)/(average value of breaking strength)×100 is not greater than 2.0%.

3. The organic fiber twisted yarn cord according to claim 1, wherein a twisted yarn damage degree of the untwisted yarns constituting the organic fiber twisted yarn cord obtained by the following formula:

twisted yarn damage degree (%)=(elongation rate of untwisted yarn at point at which stress before breaking becomes maximum)−(elongation rate of untwisted yarn at maximum point in differential Young's modulus curve)

is not less than 3.2.

4. The organic fiber twisted yarn cord according to claim 3, wherein the twisted yarn damage degree is not less than 3.7%.

5. The organic fiber twisted yarn cord according to claim 1, wherein a twist factor K of a second twist obtained by the following formula:

twist factor of second twist $K=Y \times D^{0.5}$, where Y is the number of twists (T/m) per meter of the organic fiber twisted yarn cord, and D is the total fineness (dtex) of the organic fiber twisted yarn cord, is in the range of 10000 to 30000.

6. The organic fiber twisted yarn cord according to claim 1, for use as a reinforcing material for aircraft tires.

7. A fiber reinforced material comprising the organic fiber twisted yarn cord according to claim 1.

8. A method for the production of the organic fiber twisted yarn cord according to claim 1, comprising producing a fiber cord by:

first twisting and winding organic fibers to form a first twisted yarn, and combining and second twisting not less than two of the first twisted yarns to form the fiber cord, wherein a yarn feed tension of the organic fibers in the first twist and the second twist is 0.01 cN/dtex to 0.3 cN/dtex; and twisting organic fibers using a ring twisting machine, wherein a flatness of a cross section of a balloon control ring obtained from the following formula:

flatness=1−(short radius of ellipse/long radius of ellipse)

is in the range of 0.50 to 0.95.

9. The method according to claim 8, wherein the organic fibers have an elongation rate of 8.0 to 14.0% under a load of 4.56 cN/dtex in a direction of elongation.

10. The method according to claim 8, wherein a degree of entanglement of the organic fibers is in the range of 4.0 to 14.0.

11. The method according to claim 8, wherein the organic fibers are polyhexamethylene adipamide fibers.

12. A method for the production of the organic fiber twisted yarn cord according to claim 1, comprising producing a fiber cord by:

separately twisting a plurality of organic fibers to form a first twisted fiber, and thereafter twisting the plurality of the first twisted fibers together without winding the first twisted fiber to form the fiber cord, wherein a feed tension of the organic fibers is 0.01 cN/dtex to 0.3 cN/dtex; and twisting organic fibers using a ring twisting machine, wherein a flatness of a cross section of a balloon control ring obtained from the following formula:

flatness=1−(short radius of ellipse/long radius of ellipse)

is in the range of 0.50 to 0.95.

13. The method according to claim 12, wherein the organic fibers have an elongation rate of 8.0 to 14.0% under a load of 4.56 cN/dtex in a direction of elongation.

14. The method according to claim 12, wherein a degree of entanglement of the organic fibers is in the range of 4.0 to 14.0.

15. The method according to claim 12, wherein the organic fibers are polyhexamethylene adipamide fibers.

* * * * *